US011328274B2

(12) United States Patent
Chauhan et al.

(10) Patent No.: US 11,328,274 B2
(45) Date of Patent: May 10, 2022

(54) DATA PROCESSING SYSTEM AND METHOD FOR MANAGING ELECTRONIC SPLIT TRANSACTIONS USING USER PROFILES

(71) Applicant: Bank of America Corporation, Charlotte, NC (US)

(72) Inventors: Sandeep Kumar Chauhan, Hyderabad (IN); Udaya Kumar Raju Ratnakaram, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/941,112

(22) Filed: Jul. 28, 2020

(65) Prior Publication Data

US 2022/0036325 A1 Feb. 3, 2022

(51) Int. Cl.
*G06Q 20/10* (2012.01)
*G06Q 20/22* (2012.01)

(52) U.S. Cl.
CPC ......... *G06Q 20/108* (2013.01); *G06Q 20/227* (2013.01)

(58) Field of Classification Search
USPC .......................................................... 705/39
See application file for complete search history.

(56) References Cited

U.S. PATENT DOCUMENTS

| 5,943,423 | A | 8/1999 | Muftic |
| 6,636,833 | B1 | 10/2003 | Flitcroft et al. |
| 7,051,212 | B2 | 5/2006 | Ginter et al. |
| 7,089,214 | B2 | 8/2006 | Wang |
| 7,155,411 | B1 | 12/2006 | Blinn et al. |
| 7,401,269 | B2 | 7/2008 | Hoda et al. |
| 7,447,966 | B2 | 11/2008 | Kamannavar et al. |
| 7,539,746 | B2 | 5/2009 | Bankier et al. |
| 7,549,050 | B2 | 6/2009 | Wheeler et al. |
| 7,954,717 | B2 | 6/2011 | Narendra et al. |
| 7,979,353 | B2 | 7/2011 | Akama |
| 8,016,189 | B2 | 9/2011 | Wang et al. |
| 8,032,743 | B2 | 10/2011 | Asay et al. |
| 8,793,188 | B2 | 7/2014 | Larkin |
| 8,838,503 | B2 | 9/2014 | Pelegero |
| 8,965,800 | B2 | 2/2015 | Soysa et al. |
| 9,082,413 | B2 | 7/2015 | Herring et al. |
| 9,189,772 | B2 | 11/2015 | Levit |
| 9,195,984 | B1 | 11/2015 | Spector et al. |
| 9,965,756 | B2 | 5/2018 | Davis et al. |

(Continued)

*Primary Examiner* — Ambreen A. Alladin (57) ABSTRACT

A system configured for managing a split transaction is disclosed. The system receives a request from a first user device associated with a first user to initiate a split transaction session between the first, second, and third users. A first user device associated with the first user includes second contact information associated with the second user. A second user device associated with the second user includes third contact information associated with the third user. The system receives an API request from the first user device to retrieve a third user profile. The system sends a request to the second user device to retrieve the third user profile. The second user device retrieves the third user profile and sends it to the system. The system retrieves the second and third user profiles and adds them to the split transaction session. The system conducts the split transaction session.

20 Claims, 5 Drawing Sheets

(56) References Cited

U.S. PATENT DOCUMENTS

| | | |
|---|---|---|
| 10,223,866 B2 | 3/2019 | Warner et al. |
| 10,275,764 B2 | 4/2019 | Nwokolo et al. |
| 10,339,523 B2 | 7/2019 | McDonough et al. |
| 10,410,209 B2 | 9/2019 | Boyle et al. |
| 10,475,031 B2 | 11/2019 | Cheong et al. |
| 2001/0027441 A1 | 10/2001 | Wankmueller |
| 2001/0032192 A1 | 10/2001 | Putta et al. |
| 2001/0034719 A1 | 10/2001 | Durand et al. |
| 2003/0119478 A1 | 6/2003 | Nagy et al. |
| 2003/0200184 A1 | 10/2003 | Dominguez et al. |
| 2004/0098350 A1 | 5/2004 | Labrou et al. |
| 2004/0107170 A1 | 6/2004 | Labrou et al. |
| 2004/0177047 A1 | 9/2004 | Graves et al. |
| 2007/0125838 A1 | 6/2007 | Law et al. |
| 2007/0125840 A1 | 6/2007 | Law et al. |
| 2013/0262310 A1 | 10/2013 | Jiminez et al. |
| 2014/0052615 A1 | 2/2014 | Andersen |
| 2014/0100931 A1* | 4/2014 | Sanchez ................. G06Q 20/02 705/40 |
| 2014/0245278 A1 | 8/2014 | Zellen |
| 2014/0258132 A1 | 9/2014 | Swamy et al. |
| 2014/0324687 A1 | 10/2014 | Lovelett et al. |
| 2015/0310408 A1* | 10/2015 | Anderson ............... G06Q 30/04 705/39 |
| 2016/0267482 A1 | 9/2016 | Keithley |
| 2017/0124536 A1 | 5/2017 | Bookstaff |
| 2017/0270499 A1* | 9/2017 | Coffman ................. G06Q 20/14 |
| 2018/0082284 A1 | 3/2018 | Gomes et al. |
| 2019/0066095 A1 | 2/2019 | Spector et al. |
| 2019/0236568 A1* | 8/2019 | Arisada ................. G06Q 20/10 |
| 2019/0304028 A9 | 10/2019 | Schultz et al. |
| 2019/0392428 A1 | 12/2019 | Bolla |

\* cited by examiner

DATA PROCESSING SYSTEM AND METHOD FOR MANAGING ELECTRONIC SPLIT TRANSACTIONS USING USER PROFILES

TECHNICAL FIELD

The present disclosure relates generally to data processing, and more specifically to a data processing system and method for managing electronic split transactions using user profiles.

BACKGROUND

Users of financial organizations face challenges when attempting to conduct a single transaction that involves more than two parties. Existing electronic transaction technologies do not equip the users of financial organizations to perform electronic split transactions between two or more users.

SUMMARY

In one embodiment, a system for managing a split transaction between two or more users is disclosed. The system includes a memory operable to store a profile directory database, where the profile directory database comprises user profiles of users using a digital transaction application. The system also includes a processor that is associated with a server and is operably coupled to the memory. The processor is configured to receive a request from a first user to initiate a split transaction session between the first user, a second user, and a third user via the digital transaction application installed on their corresponding user devices.

The first user is associated with a first user device. The first user device has contact information of the second user. The first user device, however, does not have contact information of the third user. The second user is associated with a second user device. The second user device has the contact information of the third user. The third user is associated with a third user device. The processor initiates the split transaction session from the digital transaction application installed on the first user device between the first user, the second user, and the third user. The processor receives an application programming interface (API) request from the first user device to retrieve a user profile of the third user. Receiving the API request is a response to the first user device sending the API request to the processor due to the first user device not having the contact information of the third user.

The user profile of the third user comprises one or more of a name, a phone number, an email address, a Universally Unique Identification (UUID), and a transaction limit associated with the third user. The processor sends a request to the second user device to retrieve the user profile of the third user. The second user device retrieves the user profile of the third user from the profile directory database and sends it to the processor, in response to receiving the request to retrieve the user profile of the third user. The processor sends the user profile of the third user to the first user device. The processor sends the user profile of the second user to the first user device, where sending the user profile of the second user to the first user device is a response to the processor retrieving the user profile of the second user from the profile directory database. The processor adds the user profiles of the second user and the third user in the digital transaction application installed on the first user device. The processor conducts the split transaction session between the first user, the second user, and the third user using this information.

Existing electronic transaction technologies lack capabilities to facilitate managing electronic split transactions among two or more users of financial organizations. Certain embodiments of this disclosure provide unique solutions to technical problems of current electronic transaction technologies, including those problems described above. For example, the disclosed system provides several technical advantages, which include: 1) obtaining contact information of users who are included in a split transaction session, but whose contact information is missing from a first user device from which the split transaction session is initiated; 2) managing a profile directory database which is configured to store user profiles of users associated with the same and/or different financial organizations, where a user profile of a user may include a name, an email address, a phone number, a Unique Universal Identification (UUID) number, transaction limits, etc. associated with the user; 3) identifying a particular user device (associated with another user whose contact information is included in the first user device) which includes the missing contact information of users who are included in the split transaction session; 4) facilitating the particular user device to obtain the missing contact information from the profile directory database; 5) linking the contact information of users with their corresponding user profiles; 6) obtaining the missing contact information directly from the particular user device, in cases where the particular user device is in a close distance proximity range (e.g., within the Bluetooth range) from the first user device to transfer the missing contact information; and 7) obtaining the missing contact information indirectly from the particular user device, in cases where the particular user device is not in a close distance proximity range (e.g., outside the Bluetooth range) from the first user device to transfer the missing contact information.

As such, this disclosure may improve the underlying function of the existing electronic transaction technologies by obtaining the missing contact information of other users who are included in the split transaction session but whose contact information is missing at the time of the split transaction session. The systems described herein may particularly be integrated into a practical application of managing a profile directory database that stores user profiles of users associated with the same and/or different financial organizations. The disclosed system also provides a practical application of reducing a risk of human error in obtaining the missing contact information in the electronic split transactions. This, in turn, provides the additional practical application of increasing the accuracy in conducting the electronic split transactions by obtaining the correct contact information associated with the users included in the electronic split transactions.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
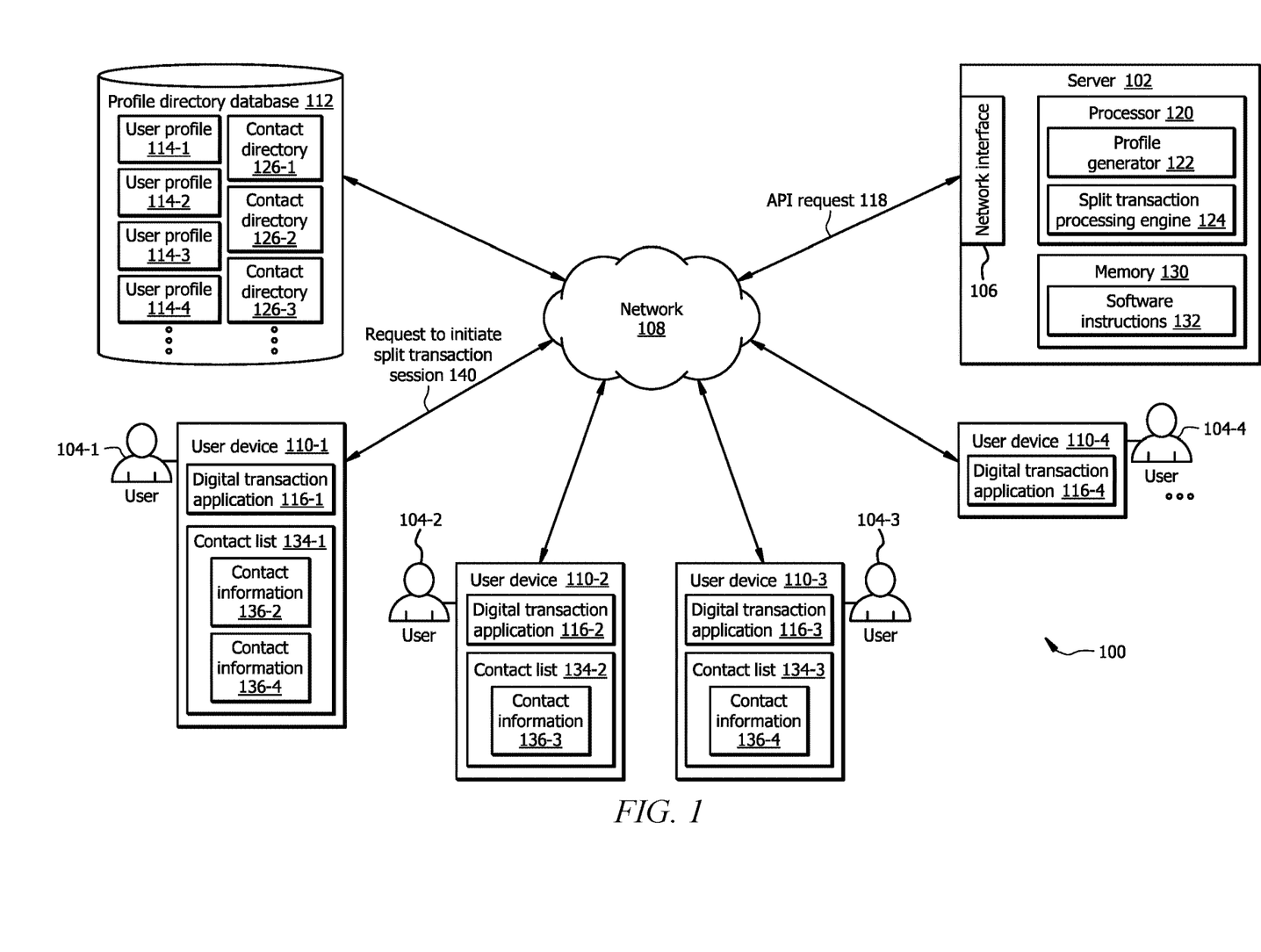
FIG. 1 illustrates one embodiment of a system configured to manage a split transaction between two or more users.

FIG. 1 illustrates one embodiment of a system 100 configured to manage a split transaction between two or more users 104. In one embodiment, the system 100 comprises a server 102 that includes a processor 120 in signal communication with a memory 130 and a network interface 106. Memory 130 includes software instructions 132 that when executed by the processor 120 cause the server 102 to perform one or more functions described herein. The server 102 is configured to communicate with a profile directory database 112 and user devices 110 (associated with users 104) via the network interface 106 through a network 108. The profile directory database 112 stores user profiles 114 and contact directories 126 (associated with users 104) that provide information which may be used by software instructions 132 and/or processor 120. In one embodiment, the processor 120 executes software instructions 132 to implement a profile generator 122 and a split transaction processing engine 124. In other embodiments, system 100 may not have all of the components listed and/or may have other elements instead of, or in addition to, those listed above.

In general, the system 100 improves electronic transaction technologies by managing a split transaction between two or more users 104, in cases where contact information 136 associated with at least one user 104 from among the two or more users 104 is missing from a user device 110 from which the split transaction session 140 is initiated.

Server 102 is generally any server, or any other computing device configured to communicate with other computing devices (e.g., user devices 110, other servers associated with financial organizations, etc.) via the network interface 106 through the network 108. In one example, the server 102 may be a backend server associated with a particular organization that facilitates conducting electronic transactions between users 104 who are registered to use the digital transaction application 116 by linking their bank accounts to the digital transaction application 116. The server 102 is associated with the digital transaction application 116. The server 102 (via the profile generator 122) is configured to manage user profiles 114 associated with the users 104. Details of the operations of the profile generator 122 are described in conjunction with FIG. 2. The server 102 (via the split transaction processing engine 124) is also configured to manage electronic split transactions between two or more users 104. Details of the operation of the split transaction processing engine 124 are described in conjunction with the operational flow illustrated in FIG. 3 and the method 400 illustrated in FIGS. 4A and 4B.

Users 104 may be clients of the same and/or different financial organizations. The financial organizations may use the digital transaction application 116 to enable their corresponding users 104 to access their bank accounts, send/receive funds to/from other users 104, etc. For example, the first user 104-1 may be associated with a first financial organization; the second user 104-2 may be associated with a second financial organization; the third user 104-3 may be associated with a third financial organization; and the fourth user 104-4 may be associated with a fourth financial organization. In this particular example, each of the first to fourth financial organizations may use the digital transaction application 116 to enable its corresponding users 104 to access their bank accounts, send/receive funds to/from other users 104, etc. In other embodiments, some or all of the users 104 may be associated with the same financial organizations.

Network interface 106 is configured to enable wired and/or wireless communications (e.g., via network 108). The network interface 106 is configured to communicate data between the server 102 and other devices (e.g., user devices 110), databases (e.g., profile directory database 112), systems, or domain(s). For example, the network interface 106 may comprise a WIFI interface, a local area network (LAN) interface, a wide area network (WAN) interface, a modem, a switch, or a router. The processor 120 is configured to send and receive data using the network interface 106. The network interface 106 may be configured to use any suitable type of communication protocol as would be appreciated by one of ordinary skill in the art.

Network 108 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 108 may be configured to support any suitable type of communication protocol as would be appreciated by one of ordinary skill in the art.

Profile directory database 112 may be implemented using any memory storage including but not limited to cloud-based memory storage comprising data centers, Network-Attached Storage (NAS), etc. The profile directory database 112 is configured to store user profiles 114 associated with users 104. Each of the user profiles 114 (associated with a user 104) includes one or more of a name, a phone number, an email address, a Universally Unique Identification (UUID), a transaction limit, etc. associated with the user 104. A particular user profile 114 associated with a particular user 104 may also specify a financial organization with which the particular user 104 is a client. A particular user profile 114 associated with a particular user 104 is linked or associated with the contact information 136 of that particular user 104. The contact information 136 associated with the particular user 104 includes a name and/or a phone number of that user 104.

The profile directory database 112 is also configured to store separate contact directories 126 for each of the users 104. In one embodiment, a particular contact directory 126 may be associated with a particular user 104, a particular contact information 136, and/or a particular user device 110. As such, the particular contact directory 126 may be found using the particular contact information 136.

In one embodiment, the particular contact directory 126 associated with the particular contact information 136 may contain contact information 136 and user profiles 114 associated with users 104 from contact list 134 in the particular user device 110 associated with the particular contact information 136. In one example, assume that the first user 104-1 has the contact information 136-2 associated with the second user 104-2 and the contact information 136-4 associated with the fourth user 104-4 in contact list 134-1 (in a memory of the first user device 110-1). Thus, the contact directory 126-1 associated with the contact information 136-1 may include the contact information 136-2, user profile 114-2, contact information 136-4, and user profile 114-4. In another example, assume that the second user 104-2 has the contact information 136-3 associated with the third user 104-3 in the contact list 134-2 (in a memory of the second user device 110-2). Thus, the contact directory 126-2 associated with the contact information 136-2 may include the contact information 136-3 and the user profile 114-3.

Each of the user devices 110 (i.e., user device 110-1 to 110-4) is generally any computing device configured to communicate with other devices, such as other user devices 110, servers (e.g., server 102), databases (e.g., profile directory database 112), etc. through the network 108. Each of the user devices 110 is configured to perform specific functions described herein and interact with users 104, e.g., via its user interfaces. Examples of user devices 110 include but are not limited to desktop computers, mobile phones, tablet computers, laptop computers, servers, etc. In one example, a particular user device 110 (associated with a particular user 104) may be a smartphone that is operable to store one or more contact information 136 associated with one or more users 104 in a contact list 134. Typically, a user 104 who is a client of a financial organization may access his/her bank account on a digital transaction application 116 from his/her user device 110.

Digital transaction application 116 may be a software application, a mobile application, a web application, and/or a software infrastructure associated with a financial organization. The digital transaction application 116 is configured to provide a user interface to enable the user 104 to access his/her bank account, financial records, transfer funds to other users 104, receive funds from other users 104, request loans from the financial organization, etc. In one example, the digital transaction application 116 may a web application on a website of the financial organization. In this example, the user 104 may access his/her bank account (via the digital transaction application 116) on the website of the financial organization once the user 104 is authenticated by the financial organization, e.g., by entering his/her username and password. In another example, the digital transaction application 116 may be a mobile application that is installed on the user device 110, such as a Smartphone. In this example, the user 104 may access his/her bank account (via the digital transaction application 116) when the user 104 is authenticated by the financial organization, e.g., by entering his/her username and password on the digital transaction application 116.

The digital transaction application 116 is configured to access the contact list 134 which includes the contact information 136 associated with other users 104. In one example, assume that the first user 104-1 wishes to transfer a particular amount of funds to the second user 104-2. The first user 104-1 accesses his/her bank account from the digital transaction application 116-1. Then, the first user 104-1 searches through the contact list 134-1 in order to find the contact information 136-2 associated with the second user 104-2. If the contact information 136-2 associated with the second user 104-2 is present in the contact list 134-1, the first user 104-1 selects the contact information 136-2, instructs the digital transaction application 116-1 to deduct the particular amount of funds from his/her bank account, and transfer the particular amount of funds to the bank account associated with the second user 104-2 and the contact information 136-2.

In one embodiment, When the first user 104-1 sends an amount of funds to the second user 104-2 using the contact information 136-2 from the digital transaction application 116-1, the digital transaction application 116-1 accesses a particular client database associated with the second user 104-2 from among client databases of a financial organization whose client is the second user 104-2. The digital transaction application 116-1 accesses the particular client database associated with the second user 104-2 by searching for a client database which includes the contact information 136-2. The digital transaction application 116-1 accesses the particular client database associated with the second user 104-2 to determine whether the second user 104-2 is using the digital transaction application 116 for his banking functions. The digital transaction application 116-1 also access client database associated with the first user 104-1 (from the client databases of a financial organization whose client is the first user 104-1) by searching for a client database which includes the contact information 136-1. The digital transaction application 116-1 access the client database associated with the first user 104-1, to determine transaction limits of the first user 104-1.

Processor 120 comprises one or more processors operably coupled to network interface 150, and memory 130. The processor 120 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 120 may be a programmable logic device, a microcontroller, a microprocessor, or any suitable combination of the preceding. The one or more processors are configured to process data and may be implemented in hardware or software. For example, the processor 120 may be 8-bit, 16-bit, 32-bit, 64-bit, or of any other suitable architecture. The processor 120 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 132) to implement the profile generator 122 and split transaction processing engine 124. In this way, processor 120 may be a special-purpose computer designed to implement the functions disclosed herein. In an embodiment, the processor 120 is implemented using logic units, FPGAs, ASICs, DSPs, or any other suitable hardware. The processor 120 is configured to operate as described in FIGS. 1-4. For example, the processor 120 may be configured to perform the steps of method 400 as described in FIG. 4.

Memory 130 may be volatile or non-volatile and may comprise a read-only memory (ROM), random-access memory (RAM), ternary content-addressable memory (TCAM), dynamic random-access memory (DRAM), and static random-access memory (SRAM). Memory 130 may be implemented using one or more disks, tape drives, solid-state drives, and/or the like. Memory 130 is operable to store the software instructions 132, and/or any other data or instructions. The software instructions 132 may comprise any suitable set of instructions, logic, rules, or code operable to execute the processor 120.

Profile Generator

Profile generator 122 may be implemented by the processor 120 executing software instructions 132, and is configured to generate user profiles 114 associated with users 104. In one embodiment, the profile generator 122 generates a particular user profile 114 for a particular user 104 by generating a data package that includes a name, a phone number, an email address, a UUID, transaction limits, etc. associated with the particular user 104. For example, when a first user 104-1 registers to use the digital transaction application 116-1, the profile generator 122 may access a first client database associated with first user 104-1 (e.g., from client databases of the financial organization whose client is the first user 104-1). The profile generator 122 may retrieve information associated with the first user 104-1 from the first client database. The profile generator 122 may then generate the user profile 114-1 for the first user 104-1 by including the information associated with the first user 104-1 in a data package. The profile generator 122 may then store the user profile 114-1 in the profile directory database 112, as shown in FIG. 2.

The profile generator 122 is also configured to generate a user profile 114 for a particular user 104 in the contact list 134-1 in the user device 110-1 associated with the first user 104-1, where the first user 104-1 has previously sent/received an amount of funds to/from the particular user 104. In this process, the profile generator 122 may send instructions to the digital transaction application 116-1 to send information associated with the particular user 104 to the profile generator 122, where the information includes a name, a phone number, an email address, a UUID, transaction limits, etc. associated with the particular user 104.

Figure 2:
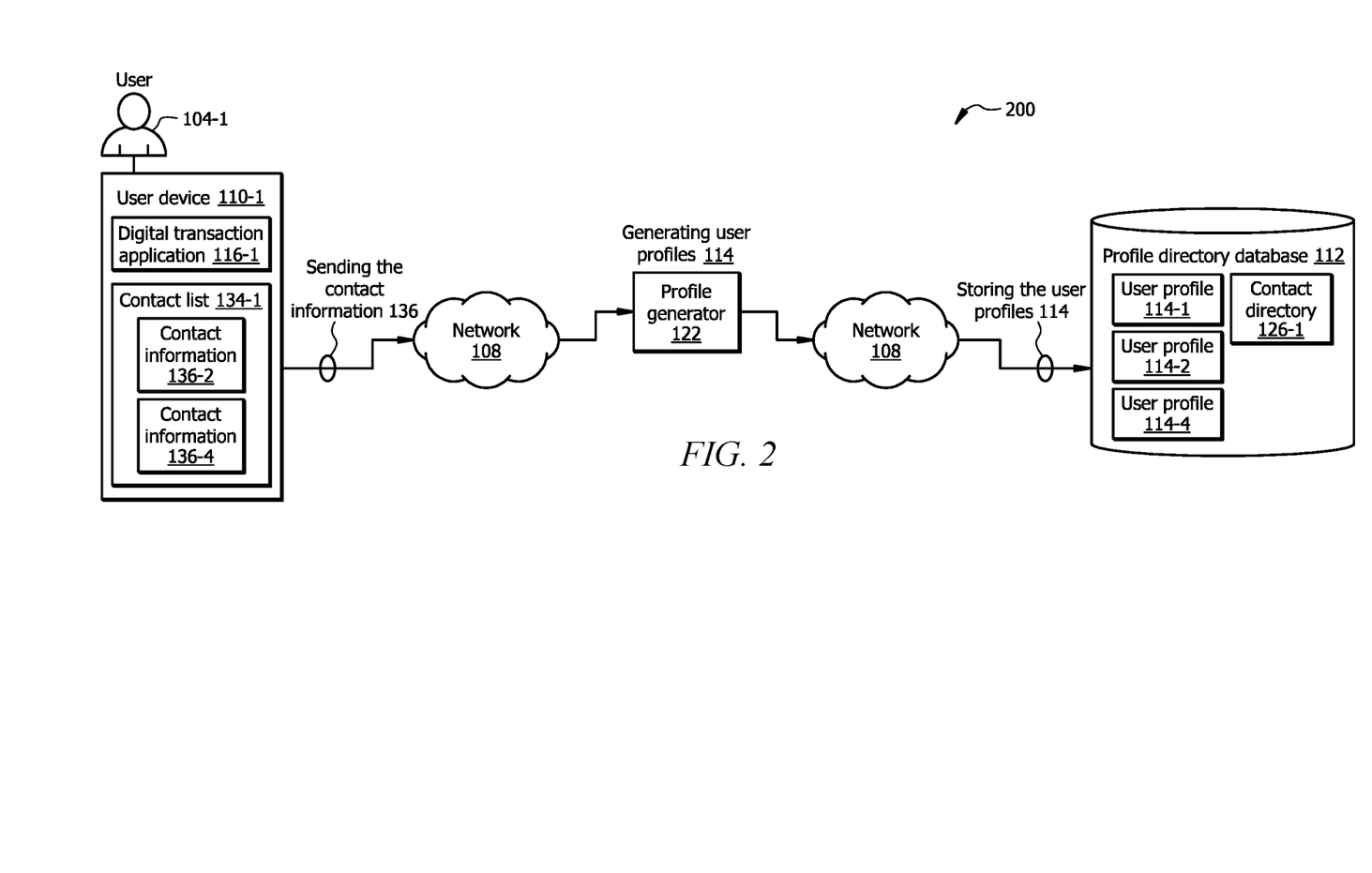
FIG. 2 illustrates an embodiment of an operational flow of a profile generator.

FIG. 2 illustrates one embodiment of the operation of the profile generator 122. In one example, assume that the first user 104-1 has previously sent/received an amount of funds to/from the second user 104-2 using contact information 136-2 from the digital transaction application 116-1. Thus, the digital transaction application 116-1 has already accessed the information associated with the second user 104-2, such as his/her name, phone number, email address, UUID, transaction limit, etc. when it accessed the client database associated with the second user 104-2. Also, assume that the first user 104-1 has previously sent/received an amount of funds to/from the fourth user 104-4 using contact information 136-4 from the digital transaction application 116-1. Thus, the digital transaction application 116-1 has already accessed the information associated with the fourth user 104-4, such as his/her name, phone number, email address, UUID, transaction limit, etc. when it accessed the client database associated with the fourth user 104-4. As such, the digital transaction application 116-1 has stored this information (i.e., the information associated with the users 104-2 and 104-4) in a transaction history of the first user 104-1.

In this particular example, the profile generator 122 sends instructions to the digital transaction application 116-1 to send the information associated with the users 104-2 and 104-4 to the profile generator 122. The digital transaction application 116-1 sends that information to the profile generator 122. The profile generator 122 generates a user profile 114-2 by creating a data package that includes the name, phone number, email address, UUID, transaction limits, etc. associated with the second user 104-2. The profile generator 122 also generates a user profile 114-4 by creating a data package that includes the name, phone number, email address, UUID, transaction limits, etc. associated with the fourth user 104-4. The profile generator 122 then stores the user profiles 114-2 and 114-4 in the profile directory database 112. In one embodiment, the profile generator 122 may also generate the contact directory 126-1 associated with the first user 104-1 and store the user profiles 114-2 and 114-4 in the contact directory 126-1.

The profile generator 122 is also configured to link or associate each user profile 114 to the contact information 136 associated with its corresponding user 104. Continuing the above example, the profile generator 122 may link or associate the user profiles 114-2 and 114-4 to the contact information 136-2 associated with the second user 104-2 and the contact information 136-4 associated with the fourth user 104-4, respectively. With this method, the particular user profile 114 may be found from among a plurality of user profiles 114 in the profile directory database 112 using its corresponding contact information 136.

In one embodiment, the profile generator 122 may instruct the digital transaction application 116-1 to send the transaction history of the first user 104-1 every time the first user 104-1 logs in his/her bank account from the digital transaction application 116-1. Thus, if the transaction history of the first user 104-1 has been updated since the last login (e.g., by the first user 104-1 sending/receiving an amount of funds to/from a new user 104), the profile generator 122 would receive the updated transaction history, generates a new user profile 114 for the new user 104, and store the new user profile 114 in the contact directory 126-1 associated with the first user 104-1.

Split Transaction Processing Engine

Referring back to FIG. 1, split transaction processing engine 124 may be implemented using software instructions 132 executed by the processor 120, and is configured to manage split transactions between two or more users 104 when a split transaction session 140 is initiated.

In one embodiment, the split transaction processing engine 124 is configured to manage split transactions between two or more users 104 by first determining whether the user device 110 (from which the split transaction session 140 is initiated) includes the contact information 136 associated with all the users 104 who are included in the split transaction session 140. In one example, assume that the user 104-1 initiated the split transaction session 140 between two or more users 104 from the digital transaction application 116-1. The digital transaction application 116-1 sends this request to the split transaction processing engine 124 via network 108. Then, the split transaction processing engine 124 (via the digital transaction application 116-1) determines whether the user device 110-1 includes the contact information 136 associated with the two or more users 104 by searching through the contact list 134-1 and finding names and/or phone numbers of the two or more users 104.

The split transaction processing engine 124 is also configured to receive an API request 118 from a digital transaction application 116 (via a particular user device 110 from which the split transaction session 140 is initiated) in a case where contact information 136 associated with at least one user 104 (who is included in the split transaction session 140) is missing from the particular user device 110. The API request 118 may include any instructions and/or data that is required for the split transaction processing engine 124 to perform the functions describe herein, e.g., retrieving user profiles 114 associated with the missing contact information 136 from the profile directory database 112.

The split transaction processing engine 124 is also configured to determine whether a digital transaction application 116 is installed on a particular user device 110 which is included in the split transaction session 140. If the split transaction processing engine 124 determines that the digital transaction application 116 is not installed on the particular user device 110, the split transaction processing engine 124 may send a text message (using the contact information 136 associated with the particular user device 110) to facilitate installing the digital transaction application 116 on the particular user device 110. Details of the operation of the split transaction processing engine 124 are described in conjunction with an example of the operational flow of the system 100 illustrated in FIG. 3.

Figure 3:
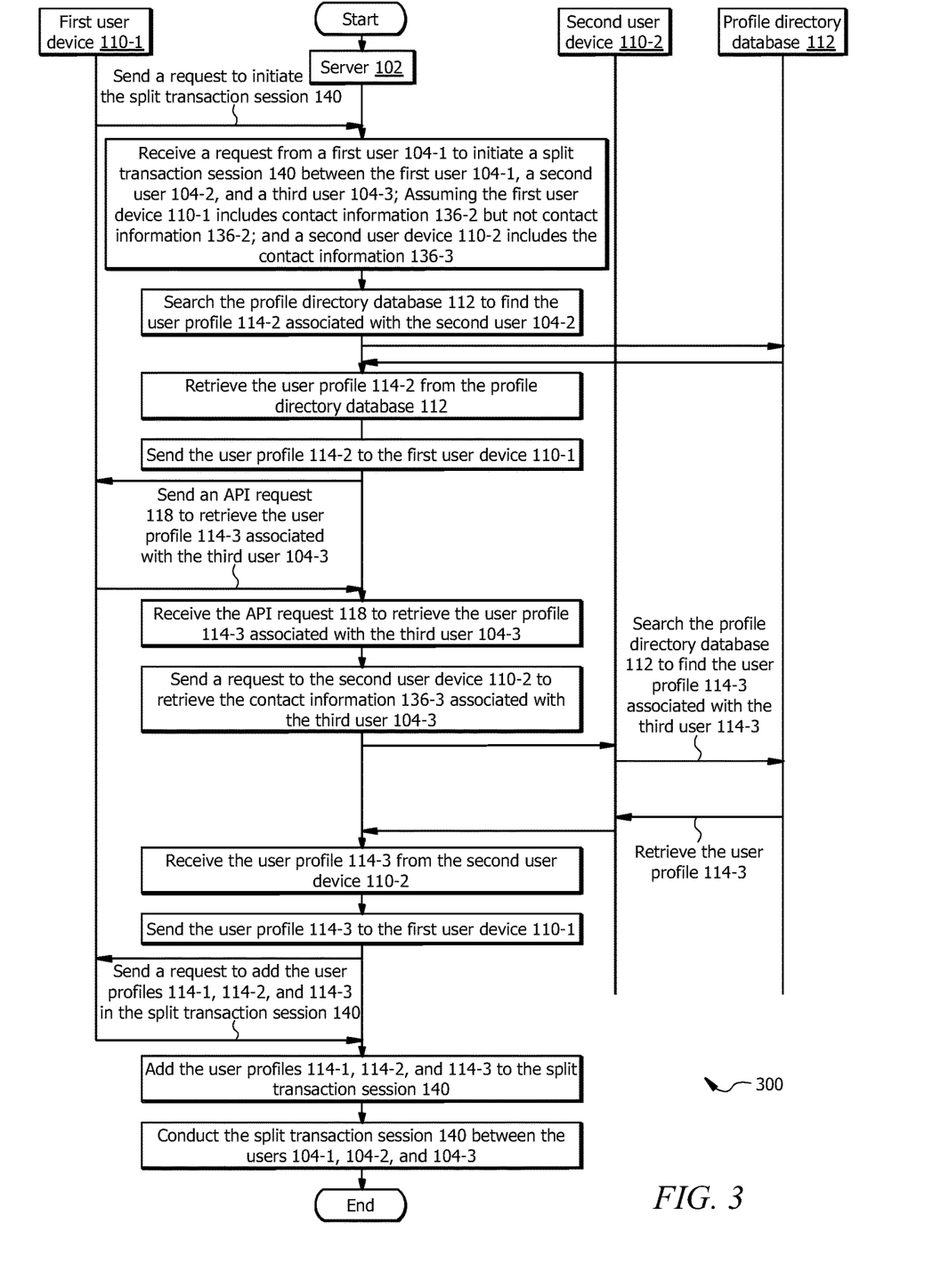
FIG. 3 illustrates an example of an operational flow of the system 100 depicted in FIG. 1.

FIG. 3 illustrates a particular example of the operational flow of the system 100 from FIG. 1. In this particular example, assume that the first user 104-1 wishes to initiate a split transaction session 140 between the first user 104-1, second user 104-2, and the third user 104-3. Also, assume that the first user device 110-1 includes the contact information 136-2 associated with the second user 104-2 (i.e., his/her name and phone number), but the first user device 110-1 does not include the contact information 136-3 associated with the third user 104-3. Also, assume that the second user device 110-2 includes the contact information 136-3 associated with the third user 104-3.

The split transaction session 140 may include identifications of the users 104 who are specified by the first user 104-1 to be included in splitting a particular transaction. In this particular example, since the first user device 110-1 includes the contact information 136-2, the split transaction session 140 may include the contact information 136-2 (i.e., the name and the phone number associated with the second user 104-2 and the second user device 110-2). However, since the first user device 110-1 does not include the contact information 136-3 (i.e., the phone number associated with the third user 104-3 and the third user device 110-3), the first user 104-1 may identify the third user 104-3, for example, by his/her name, email address, etc. in the split transaction session 140. The split transaction session 140 may also include the previously agreed-upon share of each of the users 104 in splitting the particular transaction. For example, assume that the first user 104-1, second user 104-2, and the third user 104-3 have agreed to share or split the particular transaction evenly among themselves, e.g., a bill for an event, such as booking a hotel, booking airline tickets, booking restaurant reservations, etc.

In the particular example illustrated in FIG. 3, the first user 104-1 wishes to send transaction requests to the user 104-2 and the third user 104-3, where the transaction requests indicate whether the user 104-2 and the third user 104-3 accept their previously agreed-upon share in splitting the particular transaction. As such, the first user 104-1 (via the digital transaction application 116-1) sends the request to initiate the split transaction session 140 to the split transaction processing engine 124 for evaluation.

The split transaction processing engine 124 (via the digital transaction application 116-1) determines whether the first user device 110-1 includes the contact information 136 associated with the users 104 (other than the first user 104-1) included in the split transaction session 140 (i.e., the second user 104-2, and the third user 104-3). In this particular example, since the split transaction session 140 has been initiated from the first user device 110-1, the contact information 136-1 associated with the first user 104-1 is already known to the split transaction processing engine 124.

Retrieving the Second User Profile

Following the assumptions discussed above, the split transaction processing engine 124 determines that the first user device 110-1 includes the contact information 136-2 associated with the second user 104-2; but not the contact information 136-3 associated with the third user 104-3, e.g., by searching the contact list 134-1 to find the contact information 136-2 and 136-3 associated with the users 104-2 and 104-3, respectively.

The split transaction processing engine 124 fetches the contact information 136-2 and uses it to search for the user profile 114-2 in the profile directory database 112. In this process, the split transaction processing engine 124 (via the user device 110-1), using the contact information 136-2, searches through the profile directory database 112 and finds the user profile 114-2 which is linked or associated with the contact information 136-2. In one embodiment, the profile generator 112 has already stored the user profile 114-2 in the contact directory 126-1 associated with the first user 104-1. Thus, the split transaction processing engine 124 may find the user profile 114-2 in the contact directory 126-1. The split transaction processing engine 124 then sends the second user profile 114-2 to the first user device 110-1 to be included in the split transaction session 140 (in the digital transaction application 116-1).

Retrieving the Third User Profile

In the particular example illustrated in FIG. 3, since the first user device 110-1 does not include the contact information 136-3 associated with the third user 104-3, the digital transaction application 116-1 sends an API request 118 to the split transaction processing engine 124 to retrieve the user profile 114-3 associated with the contact information 136-3. The split transaction processing engine 124 receives the API request 118 (from the first user device 110-1 via the digital transaction application 116-1) to fetch the user profile 114-3. In order to fetch the user profile 114-3 from the profile directory database 112, the split transaction processing engine 124 may first retrieve the contact information 136-3. Thus, in this particular example, the split transaction processing engine 124 sends a request to the second user device 110-2 (using the contact information 136-2) to determine whether it includes the contact information 136-3 associated with the third user 104-3. Since the second user device 110-2 includes the contact information 136-3, the split transaction processing engine 124 retrieves the contact information 136-3. Then, the digital transaction application 116-2 (via the second user device 110-2), using the contact information 136-3, searches through the profile directory database 112 and finds the user profile 114-3 of the third user 104-3 which is linked or associated with the contact information 136-3. The digital transaction application 116-2 retrieves the user profile 114-3 from the profile directory database 112.

In one embodiment where the second user device 110-2 and the first user device 110-1 are not in a close proximity range, for example outside the Bluetooth range, the second user device 110-2 (instructed by the digital transaction application 116-2) may send the user profile 114-3 to the split transaction processing engine 124 using a long-haul communication method. The split transaction processing engine 124 then sends the user profile 114-3 to the first user device 110-1 to be included in the split transaction session 140. In some examples, the split transaction processing engine 124 may send user profile 114-3 to the first user device 110-1, e.g., via a text message, a push notification, an email message, etc.

In another embodiment where the second user device 110-2 and the first user device 110-1 are in a close proximity range, for example within range for using Bluetooth, the second user device 110-2 (instructed by the digital transaction application 116-2) may directly send the user profile 114-3 to the first user device 110-1. In one example, the second user device 110-2 may directly send the user profile 114-3 to the first user device 110-1, by using the Bluetooth Low Energy (BLE) communication method. In another example, the second user device 110-2 may directly send the user profile 114-3 to the first user device 110-1 by using the Airdrop method.

In one embodiment, the profile generator 122 may add the second user profile 114-2 and the third user profile 114-3 to the contact directory 126-1 associated with the first user 104-1. Thus, the second user profile 114-2 and the third user profile 114-3 may be available for the split transaction processing engine 124 to retrieve from the contact directory 126-1 in other split transaction sessions 140 (initiated by the first user 104-1) in which one or both of the second user 104-2 and the third user 104-3 are included.

Now that the user profiles 114-2 and 114-3 are present in the first user device 110-1, the digital transaction application 116-1 adds them to the split transaction session 140 to be able to send the transaction requests to the user device 110-2 and the user device 110-3. The split transaction processing engine 124 then proceeds to conduct the split transaction session 140 from the digital transaction application 116-1. In this process, the split transaction processing engine 124 determines the amounts of funds to be taken from bank accounts of each of the first user 104-1, the second user 104-2, and the third user 104-3, based on the agreed-upon share in splitting the transaction for each of the users 104 (e.g., evenly split). Then, the split transaction processing engine 124 sends requests to the second user 104-2 (on the digital transaction application 116-2 installed on the second user device 110-2) and to the third user 104-3 (on the digital transaction application 116-3 installed on the third user device 110-3) to approve their corresponding previously agreed-upon share in splitting the particular transaction. Once the second user 104-2 and the third user 104-3 agree with their corresponding previously agreed-upon share, the split transaction processing engine 124 accesses their bank accounts and deducts their corresponding agreed-upon share.

For example, assume that the first user 104-1, the second user 104-2, and the third user 104-3 have agreed to split a 90 USD bill for an event, where each of the users 104 is responsible for the one-third of the 90 USD bill (i.e., 30 USD). As such, the first user 104-1 (via the digital transaction application 116-1) sends a first transaction request to the second user 104-2 (displayed on the digital transaction application 116-2), where the first transaction request indicates whether the second user 104-2 approves 30 USD to be taken from his/her bank account. Also, the first user 104-1 (via the digital transaction application 116-1) sends a second transaction request to the third user 104-3 (displayed on the digital transaction application 116-3), where the second transaction request indicates whether the third user 104-3 approves 30 USD to be taken from his/her bank account. If the second user 104-2 and the third user 104-3 approve their corresponding transaction requests, the split transaction processing engine 124 deducts 30 USD from each of their bank accounts, accordingly. The split transaction processing engine 124 also deducts 30 USD from the bank account associated with the first user 104-1. More details of the operation of the split transaction processing engine 124 are described in conjunction with the method 400 illustrated in FIGS. 4A and 4B.

Example of a Method for Managing a Split Transaction Between Two or More Users

Figure 4A:
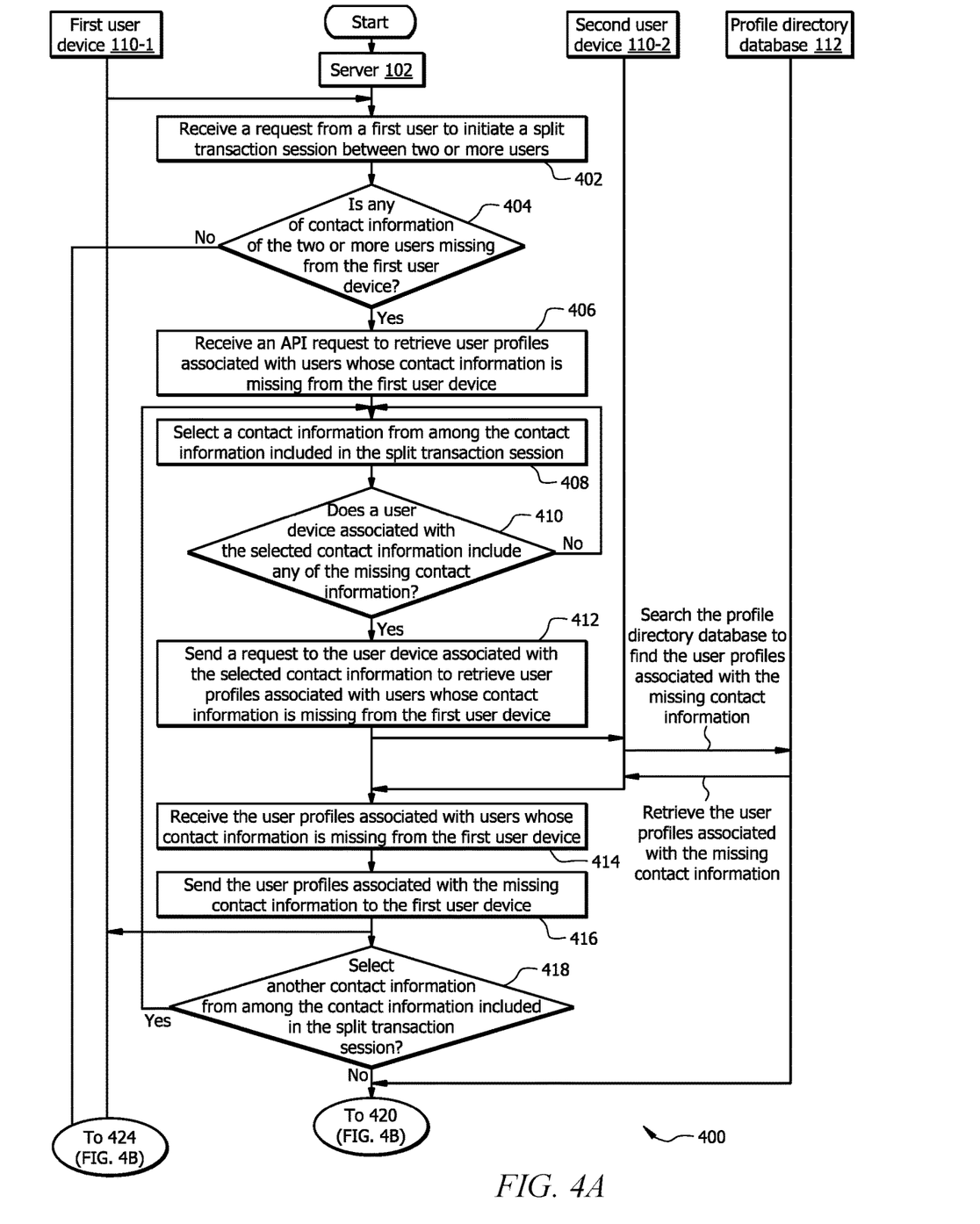
FIGS. 4A and 4B illustrate an example of a flow chart of a method for managing a split transaction between two or more users.
Figure 4B:
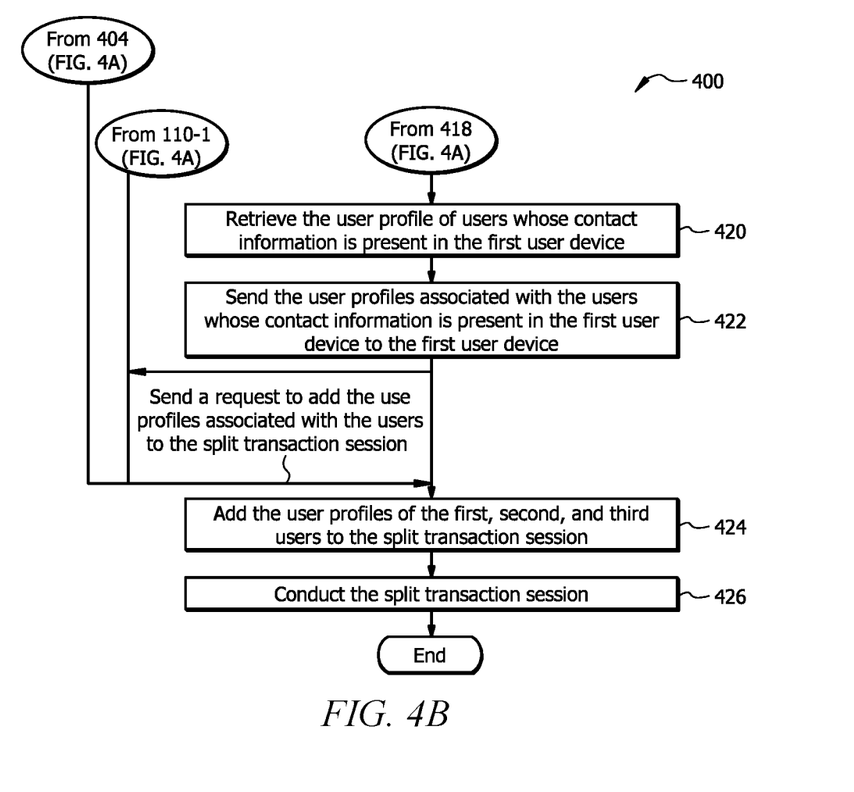

FIGS. 4A and 4B illustrate a flow chart of a method 400 for managing a split transaction between two or more users 104. One or more of steps 402-426 of the method 400 may be implemented, at least in part, in the form of software instructions 132 stored on non-transitory, tangible, machine-readable media (e.g., memory 130) that when run by one or more processors (e.g., processor 120) may cause the one or more processors to perform steps 402-426. In some embodiments, method 400 may be performed on system 100 of FIG. 1, including the server 102, user devices 110, profile directory database 112, processor 120, profile generator 122, and split transaction processing engine 124. Aspects of the steps 402-426 of the method 400 have been covered in the description for FIGS. 1-3; and additional aspects are provided below.

The method 400 begins at step 402 where the split transaction processing engine 124 receives a request from the first user 104-1 to initiate the split transaction session 140 between two or more users 104 (e.g., the first user 104-1, the second user 104-2, the third user 104-3, and other users 104, etc.), where each of the two or more users 104 is associated with a user device 110. For example, the first user 104-1 may send the request to initiate the split transaction session 140 from the digital transaction application 116-1, e.g., by operating the user interfaces of the digital transaction application 116-1.

The split transaction session 140 may include the users 104 identified by the first user 104-1 to be included in splitting a particular transaction. In cases where the first user device 110-1 includes the contact information 136 (i.e., the name and the phone number) associated with a particular user 104, the split transaction session 140 may also include the contact information 136 associated with the particular user 104. In cases where the first user device 110-1 does not include contact information 136 associated with a particular user 104, the first user 104-1 may identify the particular user 104, e.g., by their names, email addresses, etc. in the split transaction session 140. The split transaction session 140 may also include the previously agreed-upon share of each of the users 104 in splitting the particular transaction.

In step 404, the split transaction processing engine 124 (via the digital transaction application 116-1) determines whether any of the contact information 136 associated with the users 104 (who are included in the split transaction session 140) missing from the first user device 110-1, as described in FIG. 3.

If the split transaction processing engine 124 determines that all the contact information 136 associated with the users 104 are present in the first user device 110-1, the method 400 proceeds to step 426 where the split transaction processing engine 124 conducts the split transaction session 140. If, however, the split transaction processing engine 124 determines that at least one contact information 136 associated with a user 104 (included in the split transaction session 140) is missing from the first user device 110-1, the method 400 proceeds to the step 406.

In step 406, the split transaction processing engine 124 receives an API request 118 from the first user device 110-1 (instructed by the digital transaction application 116-1) which indicates to retrieve user profiles 114 associated with users 104 whose contact information 136 are missing from the first user device 110-1 (i.e., the missing contact information 136).

In step 408, the split transaction processing engine 124 selects a contact information 136 (i.e., a name and a phone number) associated with a particular user 104 from among the contact information 136 identified in the split transaction session 140. The split transaction processing engine 124 iteratively selects a contact information 136 (i.e., a name and a phone number) from among the contact information 136 identified in the split transaction session 140 until all the user profiles 114 associated with the users 104 included in the split transaction session 140 are retrieved from the profile directory database 112 and present in the first user device 110-1.

For example, assume that the split transaction processing engine 124 selects the second contact information 136-2 (which is included in the split transaction session 140), where the second contact information 136-2 is associated with the second user 104-2. The split transaction processing engine 124 may then identify the second user device 110-2 using the selected contact information 136-2 (i.e., the selected name and the phone number associated with the second user device 110-2).

In step 410, the split transaction processing engine 124 determines whether the second user device 110-2 (associated with the selected contact information 136-2) includes any of the missing contact information 136. In this process, the split transaction processing engine 124 (via the user device 110) searches the profile directory database 112, using the contact information 136-2, to find the contact directory 126-2 which is associated with the selected contact information 136-2.

If the split transaction processing engine 124 determines that the second user device 110-2 does not include any of the missing contact information 136, the method 400 returns to the step 408, where the split transaction processing engine 124 selects another contact information 136 from among the contact information 136 included in the split transaction session 140. If, however, the split transaction processing engine 124 determines that the second user device 110-2 includes any of the missing contact information 136, the method 400 proceeds to the step 412.

In step 412, the split transaction processing engine 124 sends a request to the second user device 110-2 to retrieve user profiles 114 associated with users 104 whose contact information 136 is missing from the first user device 110-1 (i.e., the missing contact information 136).

In a first example, assume that the split transaction session 140 is among the users 104-1 to 104-4. Also, assume that the first user device 110-1 (associated with the first user 104-1) only includes the contact information 136-2 associated with the second user 104-2 in the contact list 134-1. Also, assume that the second user device 110-2 (associated with the second user 104-2) includes the contact information 136-3 associated with the third user 104-3 and the contact information 136-4 associated with the fourth user 104-4 in the contact list 134-2.

In this particular example, the split transaction processing engine 124 sends a request to the second user device 110-2 to retrieve the user profiles 114-3 and 114-4 associated with the contact information 136-3 and 136-4, respectively, which are missing from the first user device 110-1. Since the second user device 110-2 includes the contact information 136-3 and 136-4, the digital transaction application 116-2 (via the second user device 110-2) searches the profile directory database 112, using the contact information 136-3 and 136-4, to find the user profiles 114-3 and 114-4 associated with the contact information 136-3 and 136-4, respectively. The digital transaction application 116-2 retrieves the user profiles 114-3 and 114-4 from the profile directory database 112 (e.g., from the contact directory 126-2 as they are previously stored by the profile generator 122 in the contact directory 126-2). In one embodiment, the second user device 110-2 (instructed by the digital transaction application 116-2) may send the user profiles 114-3 and 114-4 directly to the first user 104-1 using the BLE communication method, as described in FIG. 3. In another embodiment, the second user device 110-2 (instructed by the digital transaction application 116-2) may send the user profiles 114-3 and 114-4 to the split transaction processing engine 124 using the long-haul communication method, to be sent to the first user device 110-1, as described in FIG. 3.

In a second example, assume that the split transaction session 140 is among the users 104-1 to 104-4. Also, assume that the first user device 110-1 (associated with the first user 104-1) only includes the contact information 136-2 associated with the second user 104-2 in the contact list 134-1. Also, assume that the second user device 110-2 (associated with the second user 104-2) only includes the contact information 136-3 associated with the third user 104-3 in the contact list 134-2. Also, assume that the third user 104-3 (associated with the third user 104-3) includes the contact information 136-4 associated with the fourth user 104-4 in the contact list 134-3.

In this particular example, the split transaction processing engine 124 sends a request to the second user device 110-2 to retrieve the user profiles 114-3 associated with the contact information 136-3 (which is missing from the first user device 110-1). Since the second user device 110-2 includes the contact information 136-3, the digital transaction application 116-2 (via the second user device 110-2) searches the profile directory database 112, using the contact information 136-3, to find the user profile 114-3 associated with the contact information 136-3. The digital transaction application 116-2 retrieves the user profiles 114-3 from the profile directory database 112 (e.g., from contact directory 126-2). In one embodiment, the second user device 110-2 (instructed by the digital transaction application 116-2) may send the user profiles 114-3 directly to the first user 104-1 using the BLE communication method, as described in FIG. 3. In another embodiment, the second user device 110-2 (instructed by the digital transaction application 116-2) may send the user profiles 114-3 to the split transaction processing engine 124 using the long-haul communication method, to be sent to the first user device 110-1, as described in FIG. 3.

Then, the split transaction processing engine 124 sends a request to the third user device 110-3 to retrieve the user profile 114-4 associated with the contact information 136-3 (which is missing from the first user device 110-1). Since the third user device 110-3 includes the contact information 136-4, the digital transaction application 116-3 (via the third user device 110-3) searches the profile directory database 112, using the contact information 136-4, to find the user profile 114-4 associated with the contact information 136-4. The digital transaction application 116-3 retrieves the user profiles 114-4 from the profile directory database 112. In one embodiment, the third user device 110-3 (instructed by the digital transaction application 116-3) may send the user profile 114-4 directly to the first user 104-1 using the BLE communication method, as described in FIG. 3. In another embodiment, the third user device 110-3 (instructed by the digital transaction application 116-3) may send the user profiles 114-4 to the split transaction processing engine 124 using the long-haul communication method, to be sent to the first user device 110-1, as described in FIG. 3.

In cases where none of the user devices 110 associated with the users 104 included in the split transaction session 140 contain any of the missing contact information 136, the split transaction processing engine 124 may identify and search the contact directories 126 associated with the other users 104 whose contact information 136 is included in the first user device 110-1 but are not included in the split transaction session 140. The split transaction processing engine 124 may identify user devices 110 associated with contact information 136 of those users 104, similar to as described in step 410. The split transaction processing engine 124 may then determine whether any of the user devices 110 associated with those users 104 include any of the missing contact information 136.

In a third example, assume that the split transaction session 140 is among the users 104-1 to 104-4. Also, assume that the first user 104-1 only has the contact information 136-2 associated with the second user 104-2 in the contact list 134-1. Also, assume that the second user 104-2 only has the contact information 136-3 associated with the third user 104-3 in the contact list 134-2. In this particular example, the split transaction processing engine 124 may retrieve the user profiles 114-2 and 114-3 similar to discussed above. However, none of the user devices 110-1 to 110-3 include the contact information 136-4. As such, the split transaction processing engine 124 may identify and search the contact directories 126 associated with other users 104 whose contact information 136 is included in the first user device 110-1 (but are not included in the split transaction session 140). The split transaction processing engine 124 may identify user devices 110 associated with those contact information 136. The split transaction processing engine 124 may determine whether any of those user devices 110 include the missing contact information 136-4. If the split transaction processing engine 124 determines that a user device 110 from among those user devices 110 include the contact information 136-4, the split transaction processing engine 124 fetches the contact information 136-4 and uses it to search for the user profile 114-4 in the profile directory database 112.

In step 414, the split transaction processing engine 124 receives the user profiles 114 associated with users 104 whose contact information 136 is missing from the first user device 110-1 (i.e., the missing contact information 136).

In step 416, the split transaction processing engine 124 sends the user profiles 114 associated with the missing contact information 136 to the first user device 110-1. In some examples, the split transaction processing engine 124 may send user profiles 114 associated with the missing contact information 136 to the first user device 110-1, e.g., via a text message, a push notification, an email message, etc. as described in FIG. 3.

In step 418, the split transaction processing engine 124 determines whether to select another contact information 136 from among the contact information 136 included in the split transaction session 140. In this process, if there is any user profile 114 still missing from the first user device 110-1, the split transaction processing engine 124 selects another contact information 136 from among the contact information 136 included in the split transaction session 140. The split transaction processing engine 124 determines to select another contact information 136 if there is at least one user profile 114 associated with one missing contact information 136 still not retrieved from the profile directory database 112. If the split transaction processing engine 124 determines that at least one user profile 114 associated with one missing contact information 136 still not present in the first user device 110-1, the method 400 returns to step 408 where the split transaction processing engine 124 selects another contact information 136 from among the contact information 136 identified in the split transaction session 140. Otherwise, the method 400 proceeds to step 420.

Until this stage, the split transaction processing engine 124 has retrieved and sent the user profiles 114 associated with users 104 whose contact information 136 is missing from the first user device 110-1.

In step 420, the split transaction processing engine 124 retrieves the user profiles 114 associated with users 104 whose contact information 136 is present in the first user device 110-1. In some embodiments, the split transaction processing engine 124 may first retrieve user profiles 114 associated with users 104 whose contact information 136 are present in the first user device 110-1; and then retrieve user profiles 114 associated with users 104 whose contact information 136 are missing from the first user device 110-1. In other embodiments, the split transaction processing engine 124 may first retrieve user profiles 114 associated with users 104 whose contact information 136 are missing from the first user device 110-1; and then retrieve user profiles 114 associated with users 104 whose contact information 136 are present in the first user device 110-1.

Continuing the first example discussed in step 408, in which the first user device 110-1 only has the contact information 136-2 associated with the second user 104-2 in the contact list 134-1, the split transaction processing engine 124, using the contact information 136-2, may identify the user profile 114-2 in the profile directory database 112. The split transaction processing engine 124 may then retrieve the user profile 114-2 from the profile directory database 112.

In step 422, the split transaction processing engine 124 sends the user profiles 114 associated with users 104 whose contact information 136 is present in the first user device 110-1 to the first user device 110-1. In some examples, the split transaction processing engine 124 may send those user profiles 114 to the first user device 110-1, e.g., via a text message, a push notification, an email message, etc., as described in FIG. 3.

The digital transaction application 116-1 sends a request to the split transaction processing engine 124 to add the user profiles 114 associated with the users 104 who were identified in the split transaction session 140 to the split transaction session 140. For example, the digital transaction application 116-1 may display that the particular user profiles 114 associated with the users 104 identified in the split transaction session 140 have been retrieved from the profile directory database 112 on a display screen of the first user device 110-1 on the user interfaces of the digital transaction application 116-1.

In step 424, the split transaction processing engine 124 adds the user profiles 114 associated with the users 104 (identified in the split transaction session 140) to the split transaction session 140.

In step 426, the split transaction processing engine 124 conducts the split transaction session 140 from the digital transaction application 116-1. In one example, the split transaction processing engine 124 conducts the split transaction session 140 as described in FIG. 3. In this process, the split transaction processing engine 124 determines amounts of funds to be taken from bank accounts of the users 104 (identified in the split transaction session 140) based on the previously agreed-upon share of each of the users 104. Then, the split transaction processing engine 124 sends requests to the users 104 (identified in the split transaction session 140) to approve their corresponding previously agreed-upon share in splitting the particular transaction. Once the users 104 agree with their corresponding previously agreed-upon share, the split transaction processing engine 124 accesses their bank accounts and deducts their corresponding agreed-upon share.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A split transaction management system, comprising:
a memory operable to store a profile directory database, wherein the profile directory database comprises user profiles of users using a digital transaction application, wherein the user profiles comprises a first user profile associated with a first user, a second user profile associated with a second user, and a third user profile associated with a third user; and
a processor of a server, operably coupled to the memory, configured to:
receive a request from a first user device to initiate a split transaction session between the first user, the second user, and the third user via a digital transaction application installed on the first user device, wherein:
the first user is associated with the first user device, wherein the first user device has contact information of the second user, the first user device does not have contact information of the third user;
the second user is associated with a second user device; and
the third user is associated with a third user device;
initiate the split transaction session from the digital transaction application installed on the first user device between the first user, the second user, and the third user;
receive an Application Programming Interface (API) request from the first user device to retrieve the third user profile, wherein:
receiving the API request is a response to the first user device sending the API request to the processor due to the first user device not having the contact information of the third user; and
the third user profile comprises one or more of a name, a phone number, an email address, a Universally Unique Identification (UUID), and a transaction limit associated with the third user;
determine whether the second user device has the contact information of the third user;
in response to determining that the second user device has the contact information of the third user:
send a second request to the second user device to retrieve the third user profile, wherein in response to receiving the second request from the processor to retrieve the third user profile, the second user device retrieves the third user profile from the profile directory database and sends the third user profile to the processor; and
send the third user profile to the first user device;
in response to determining that the contact information of the third user is missing from the first user device and the second user device:
determine whether any user devices associated with any other users from a contact list stored in the first user device who are not included in the split transaction session include the contact information of the third user by:
for each particular contact information of a user who is not included in the split transaction session in the contact list:
identify a user device associated with the particular contact information; and
send a second API request to the identified user device, wherein the second API request indicates whether the identified user device stores the contact information of the third user;
receive from one or more user devices associated with any of the other users from the contact list who is not included in the split transaction session the third user profile, wherein receiving the third user profile is in response to the one or more user devices retrieving the third user profile from the profile directory database;
in response to determining that the contact information of the second user is found in the first user device:
query the profile directory database to find the second user profile;
fetch the second user profile from the profile directory database; and
send the second user profile to the first user device;
fetch the first user profile from the profile directory database;
add the first user profile, the second user profile, and the third user profile in the digital transaction application installed on the first user device; and
conduct the split transaction session between the first user, the second user, and the third user using the electronically fetched first user profile, second user profile, and third user profile, thereby reducing a risk of human error in obtaining the missing contact information and improving accuracy and security in conducting the split transaction session.

2. The system of claim 1, wherein the first user device, the second user device, and the third user device are mobile devices capable of storing contact information.

3. The system of claim 1, wherein sending the third user profile to the first user device comprises:

sending the third user profile from the server via a text message.

4. The system of claim 1, wherein:
the second user profile is linked to the contact information of the second user; and
the contact directory associated with the first user is stored in the profile directory database.

5. The system of claim 1, wherein the processor is further configured to:
before conducting the split transaction session, determine whether the digital transaction application is installed on the second user device and the third user device; and
in response to a determination that the digital transaction application is not installed on any of the second user device and the third user device, send a text message to any of the second user device and the third user device in which the digital transaction application is not installed.

6. The system of claim 1, wherein conducting the split transaction session between the first user, the second user, and the third user comprises:
determining amounts of funds to be taken from bank accounts of the first user, the second user, and the third user according to an agreed split share for each of the first user, the second user, and the third user;
sending requests to the digital transaction applications installed on the second user device and the third user device; and
taking the determined amounts of funds from the bank accounts of the first user, the second user, and the third user, wherein the bank accounts of the first user, the second user, and the third user are linked to the digital transaction application installed on their corresponding user device.

7. The system of claim 1, wherein:
the second user device, in response to receiving the second request from the processor to retrieve the third user profile, retrieves the third user profile from the profile directory database and sends the third user profile to the first user device when the first user device and the second user device are in a close proximity range using a Bluetooth Low Energy (BLE) communication method.

8. A split transaction management method, comprising:
receiving a request from a first user device to initiate a split transaction session between the first user, a second user, and a third user via a digital transaction application installed on the first user device, wherein:
the first user is associated with the first user device, wherein the first user device has contact information of the second user, the first user device does not have contact information of the third user;
the second user is associated with a second user device, and
the third user is associated with a third user device;
initiating the split transaction session from a digital transaction application installed on the first user device between the first user, the second user, and the third user;
receiving an Application Programming Interface (API) request from the first user device to retrieve a third user profile of the third user, wherein:
receiving the API request is a response to the first user device sending the API request to a processor due to the first user device not having the contact information of the third user; and
the third user profile comprises one or more of a name, a phone number, an email address, a Universally Unique Identification (UUID), and a transaction limit associated with the third user;
determining whether the second user device has the contact information of the third user;
in response to determining that the second user device has the contact information of the third user:
sending a second request to the second user device to retrieve the third user profile, wherein in response to receiving the second request from a processor to retrieve the third user profile, the second user device retrieves the third user profile from a profile directory database and sends the third user profile to the processor;
sending the third user profile to the first user device;
in response to determining that the contact information of the third user is missing from the first user device and the second user device:
determining whether any user devices associated with any other users from a contact list stored in the first user device who are not included in the split transaction session include the contact information of the third user by:
for each particular contact information of a user who is not included in the split transaction session in the contact list:
identifying a user device associated with the particular contact information; and
sending a second API request to the identified user device, wherein the second API request indicates whether the identified user device stores the contact information of the third user;
receiving from one or more user devices associated with any of the other users from the contact list who is not included in the split transaction session the third user profile, wherein receiving the third user profile is in response to the one or more user devices retrieving the third user profile from the profile directory database;
in response to determining that the contact information of the second user is found in the first user device:
querying the profile directory database to find a second user profile of the second user;
fetching the second user profile from the profile directory database; and
sending the second user profile to the first user device;
fetching a first user profile of the first user from the profile directory database;
adding the first user profile, the second user profile, and the third user profile in the digital transaction application installed on the first user device; and
conducting the split transaction session between the first user, the second user, and the third user using the electronically fetched first user profile, second user profile, and third user profile, thereby reducing a risk of human error in obtaining the missing contact information and improving accuracy and security in conducting the split transaction session.

9. The method of claim 8, wherein the first user device, the second user device, and the third user device are mobile devices capable of storing contact information.

10. The method of claim 8, wherein sending the third user profile to the first user device comprises:
sending the user profile from the server via a text message.

11. The method of claim 8, wherein:
the second user profile is linked to the contact information of the second user; and
the contact directory associated with the first user is stored in the profile directory database.

12. The method of claim 8, wherein the method is further comprising:
before conducting the split transaction session, determining whether the digital transaction application is installed on the second user device and the third user device; and
in response to a determination that the digital transaction application is not installed on any of the second user device and the third user device, sending a text message to any of the second user device and the third user device in which the digital transaction application is not installed.

13. The method of claim 8, wherein conducting the split transaction session between the first user, the second user, and the third user comprises:
determining amounts of funds to be taken from bank accounts of the first user, the second user, and the third user according to an agreed split share for each of the first user, the second user, and the third user;
sending requests to the digital transaction applications installed on the second user device and the third user device; and
taking the determined amounts of funds from the bank accounts of the first user, the second user, and the third user, wherein the bank accounts of the first user, the second user, and the third user are linked to the digital transaction application installed on their corresponding user device.

14. The method of claim 8, wherein:
the second user device, in response to receiving the second request from the processor to retrieve the third user profile, retrieves the third user profile from the profile directory database and sends the third user profile to the first user device when the first user device and the second user device are in a close proximity range using a Bluetooth Low Energy (BLE) communication method.

15. A computer program comprising executable instructions stored in a non-transitory computer-readable medium that when executed by a processor causes the processor to:
receive a request from a first user device to initiate a split transaction session between the first user, a second user, and a third user via a digital transaction application installed on the first user device, wherein:
the first user is associated with the first user device, wherein the first user device has contact information of the second user, the first user device does not have contact information of the third user;
the second user is associated with a second user device, and
the third user is associated with a third user device;
initiate the split transaction session from a digital transaction application installed on the first user device between the first user, the second user, and the third user;
receive an Application Programming Interface (API) request from the first user device to retrieve a third user profile of the third user, wherein:
receiving the API request is a response to the first user device sending the API request to the processor due to the first user device not having the contact information of the third user; and
the third user profile comprises one or more of a name, a phone number, an email address, a Universally Unique Identification (UUID), and a transaction limit associated with the third user;
determine whether the second user device has the contact information of the third user;
in response to determining that the second user device has the contact information of the third user:
send a second request to the second user device to retrieve the third user profile, wherein in response to receiving the second request from the processor to retrieve the third user profile, the second user device retrieves the third user profile from a profile directory database and sends the third user profile to the processor;
send the third user profile to the first user device;
in response to determining that the contact information of the third user is missing from the first user device and the second user device:
determine whether any user devices associated with any other users from a contact list stored in the first user device who are not included in the split transaction session include the contact information of the third user by:
for each particular contact information of a user who is not included in the split transaction session in the contact list:
identify a user device associated with the particular contact information; and
send a second API request to the identified user device, wherein the second API request indicates whether the identified user device stores the contact information of the third user;
receive from one or more user devices associated with any of the other users from the contact list who is not included in the split transaction session the third user profile, wherein receiving the third user profile is in response to the one or more user devices retrieving the third user profile from the profile directory database;
in response to determining that the contact information of the second user is found in the first user device:
query the profile directory database to find a second user profile of the second user;
fetch the second user profile from the profile directory database; and
send the second user profile to the first user device;
fetch a first user profile of the first user from the profile directory database;
add the first user profile, the second user profile, and the third user profile in the digital transaction application installed on the first user device; and
conduct the split transaction session between the first user, the second user, and the third user using the electronically fetched first user profile, second user profile, and third user profile, thereby reducing a risk of human error in obtaining the missing contact information and improving accuracy and security in conducting the split transaction session.

16. The computer program of claim 15, wherein the first user device, the second user device, and the third user device are mobile devices capable of storing contact information.

17. The computer program of claim 15, wherein sending the third user profile to the first user device comprises:
sending the third user profile from a server via a text message.

18. The computer program of claim 15, wherein:
the second user profile is linked to the contact information of the second user; and
the contact directory associated with the first user is stored in the profile directory database.

19. The computer program of claim 15, wherein the processor is further configured to:
before conducting the split transaction session, determine whether the digital transaction application is installed on the second user device and the third user device; and
in response to a determination that the digital transaction application is not installed on any of the second user device and the third user device, send a text message to any of the second user device and the third user device in which the digital transaction application is not installed.

20. The computer program of claim 15, wherein conducting the split transaction session between the first user, the second user, and the third user comprises:
determining amounts of funds to be taken from bank accounts of the first user, the second user, and the third user according to an agreed split share for each of the first user, the second user, and the third user;
sending requests to the digital transaction applications installed on the second user device and the third user device; and
taking the determined amounts of funds from the bank accounts of the first user, the second user, and the third user, wherein the bank accounts of the first user, the second user, and the third user are linked to the digital transaction application installed on their corresponding user device.

\* \* \* \* \*